Dec. 19, 1967　　　　　F. C. PRUVOT　　　　　3,358,711
VALVE
Filed July 20, 1965　　　　　　　　　　　　　　3 Sheets-Sheet 2
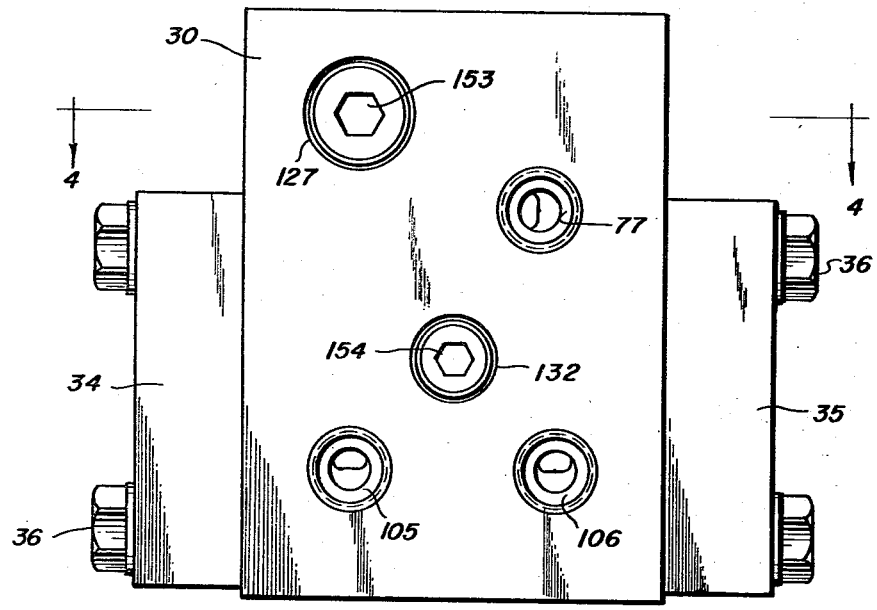
FIG. 3
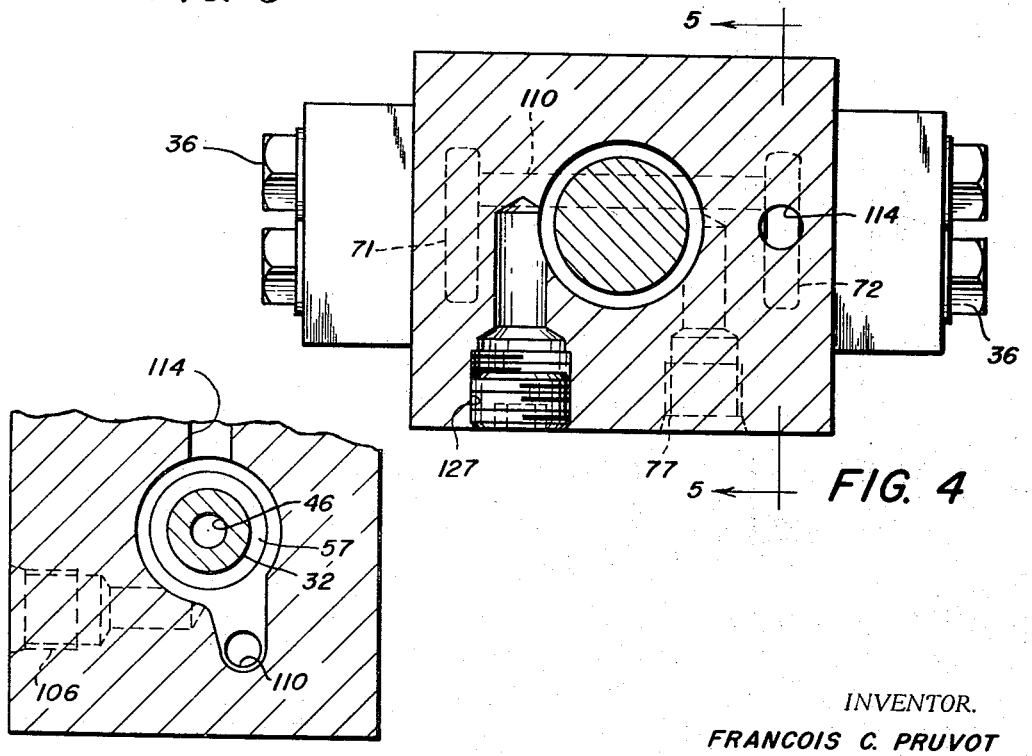
FIG. 4
FIG. 5
INVENTOR.
FRANCOIS C. PRUVOT
BY
Woodling Krost Granger + Rust
attys.

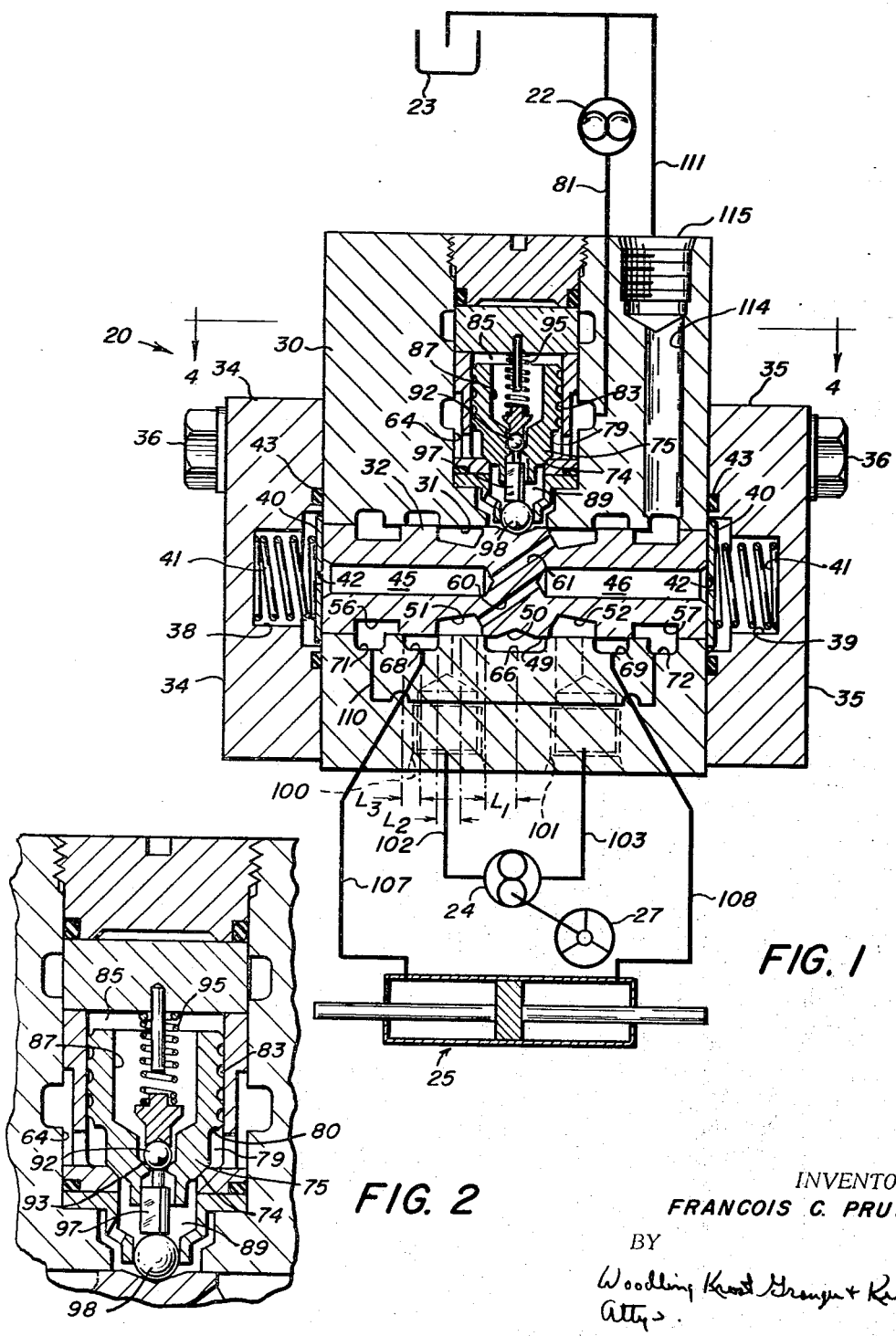

Dec. 19, 1967  F. C. PRUVOT  3,358,711
VALVE
Filed July 20, 1965  3 Sheets-Sheet 3

INVENTOR.
FRANCOIS C. PRUVOT
BY
Woodling, Krost, Granger & Rust
attys.

United States Patent Office 3,358,711
Patented Dec. 19, 1967

3,358,711
VALVE
Francois C. Pruvot, Garches, Seine-et-Oise, France, assignor to TRW Inc., Euclid, Ohio, a corporation of Ohio
Filed July 20, 1965, Ser. No. 473,433
10 Claims. (Cl. 137—596)

The present invention relates in general to valve constructions and more particularly to control valve constructions for hydraulic powered circuits where amplification of force, torque or pressure as a result of hydraulic control is desired. Such control valve constructions are utilizable in many hydraulic circuits and are particularly adaptable for use in hydrostatic power steering systems of either the closed center or open center type with which they will be described hereinafter.

An object of the present invention is to provide a hydraulic valve construction with a poppet or admittance valve feature which prevents the flow of pressurized fluid to the hydraulic valve orifices until the orifices have opened sufficiently thereby reducing the flow forces on the spool of the hydraulic valve.

Another object of the present invention is to provide a hydraulic valve construction whereby silting of the valve spool is greatly reduced if not entirely eliminated.

Another object of the present invention is to provide a hydraulic valve construction whereby the valve spool is effectively dampened eliminating any high frequency chatter of the valve.

Another object of the present invention is to provide a hydraulic valve wherein the flow paths and lengths thereof are designed to, in most instances, provide a positive damping length.

Another object of the present invention is to provide a hydraulic valve with an admittance valve feature whereby the admittance valve is actuated by an actuating member, which actuating member at one end is operable with the admittance valve and at the other end with a cam surface on the valve spool.

Another object of the present invention is to provide an admittance or poppet valve construction for either a closed or open center system wherein the poppet valve is caused to be moved (either to open or closed position as the case may be) by a shifting of the major force component (which major force component is created by inlet pressure acting on surface areas of the poppet valve) acting on the poppet valve from a direction opposite that which it previously acted in, which shifting is signalled by a means external to the poppet valve, as by movement of a main valve spool.

Another object of the present invention is to provide an admittance or poppet valve construction for a closed center system which includes a valve seat with inlet and outlet sides and wall means on the poppet valve upon which inlet pressure acts to open same and first passageway means leading from the inlet to an end of the poppet valve upon which inlet pressure acts to close the poppet valve and second passageway means leading from the end of the poppet valve to the outlet side thereof with another valve in the second passageway means normally closed and when so closed causing the force component acting on the poppet valve to be in a direction to keep the same closed and when opened causing the force component acting on the poppet valve to be in a direction to keep the same open.

Another object of the present invention is to provide an admittance or poppet valve construction for an open center system which includes a poppet valve seat with the poppet valve having inlet and outlet sides and wall means on the poppet valve upon which inlet pressure acts to open same and first passageway means leading from the inlet to an end of the poppet valve upon which inlet pressure acts to close the poppet valve and second passageway means leading from the end of the poppet valve to the outlet side thereof with another valve in the second passageway means normally open and when so open causing the force component acting on the poppet valve to be in a direction to keep the same open and when closed causing the force component acting on the poppet valve to be in a direction to keep the same closed.

Other objects and a fuller understanding of this invention may be had by referring to the following description and claims, taken in conjunction with the accompanying drawings, in which:

FIGURE 1 is an elevational view in section of a valve constructed in accordance with the teachings of the present invention with the associated hydraulic circuit illustrated schematically;

FIGURE 2 is an enlarged fragmentary view of a portion of the valve shown in FIGURE 1;

FIGURE 3 is an elevational view of the valve shown in FIGURE 1 taken in the same direction but not in section;

FIGURE 4 is a view taken generally along the line 4—4 of FIGURES 1 and 3;

FIGURE 5 is a view taken generally along the line 5—5 of FIGURE 4;

Figure 6:
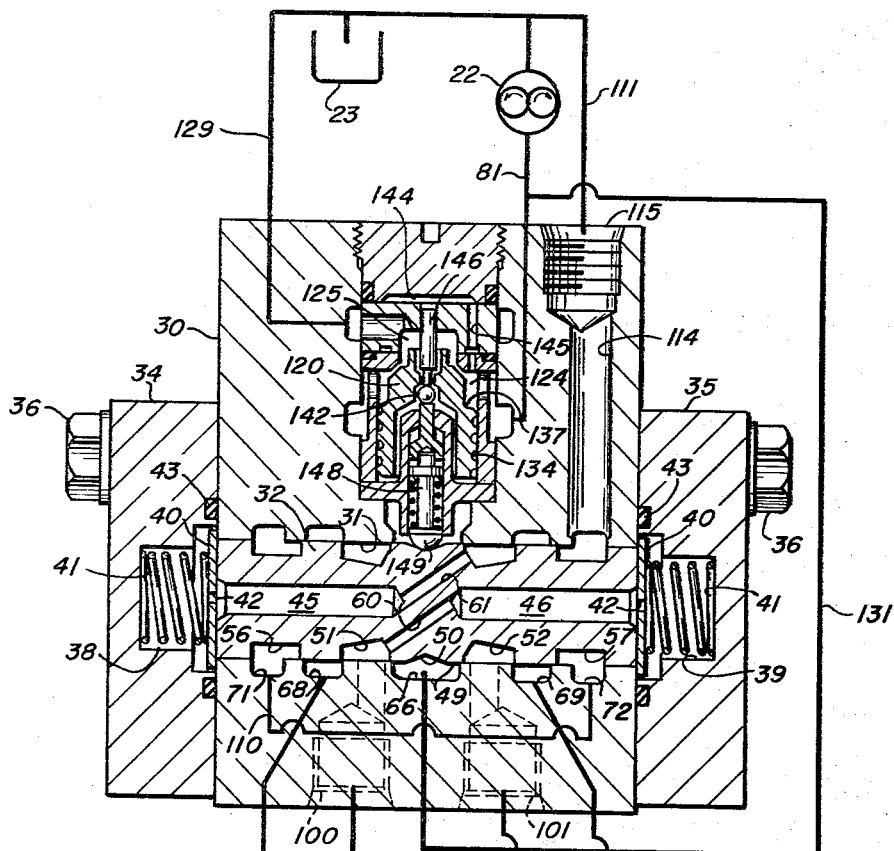
FIGURE 6 is an elevational view in section of a modification of the valve shown in FIGURE 1 but constructed in accordance with the teachings of the present invention with the associated hydraulic circuit illustrated schematically.

As mentioned above the present invention relates to control valve constructions, however, in order to enable those skilled in the art to utilize the same the valve construction 20 shown in FIGURE 1 has been specifically designed for use with a hydrostatic power steering system such as those used with land type vehicles, for example tractors and the like. The hydraulic circuit which has been shown is generally referred to as the closed center type. The power steering system shown includes generally the valve construction 20, a power pump 22 of the constant pressure type, a reservoir or sump 23, a metering pump 24, and a work cylinder 25 which has been shown as a piston and cylinder arrangement.

The metering pump 24 will be described more specifically hereinafter, however, this pump for the purpose of illustration may be of that construction and function which is described in U.S. Patent Number 3,087,436, issued April 30, 1963, in the name of L. A. Dettlof et al. The work cylinder 25 is of a conventional construction and merely serves to transform the movement which is transmitted to the piston to the function of turning the vehicle wheels in an appropriate direction. This construction may be of that construction shown in U.S. Patent Number 3,059,717 issued October 23, 1962, in the name of D. W. Moyer et al. In the present construction the metering pump 24 is actuated by means of an operator of the vehicle turning a vehicle steering wheel 27.

The present invention relates primarily to the valve construction 20 which has application to many hydraulic valves and which is particularly adaptable and advantageous when used in hydrostatic power steering systems.

The valve construction includes a housing 30 having wall means which define a generally cylindrically shaped main bore 31. A valve spool 32 is positioned in the main bore and is adapted for movement from a neutral position within which it is shown, to a first position, which, for example may be to the left as seen in FIGURE 1, or a second position which may be to the right as viewed in FIGURE 1. The housing 30 also includes blocks 34 and 35 secured to the main part of the housing by bolts 36 and each of these blocks is machined to form first and second chambers 38 and 39 located at opposed ends of the valve spool 32. The construction of each of the chambers 38 and 39 is identical and includes a plate 40 abutting a respective end of the valve spool and constantly biased into engagement therewith by means of a spring 41. Each of the plates 40 is provided with a central opening 42. An O-ring 43 is provided for sealing between the engaging surface of the blocks and the main part of the housing 30. The springs 41 constantly bias the valve spool 32 to its neutral position.

The opposed ends of the valve spool 32 are provided with axial openings 45 and 46, respectively, and these axial openings are in fluid communication with the first and second chambers 38 and 39 respectively, by way of the central opening 42 in an associated plate 40. The valve spool 32 is provided with an intermediate land 49 midway between its opposed ends and wall means on this land 49 serve to define a cam surface 50. The valve spool is also provided with first and second switching grooves 51 and 52 on opposed sides of the intermediate land and first and second return-cylinder grooves 56 and 57 are provided on the spol at opposite ends thereof or outside of the switching grooves with respect to the intermediate land 49. These return-cylinder grooves are spaced from an associated switching groove by a land. First passageway means 60 provides for fluid communication between the first switching groove 51 and the axial opening 46 and second passageway means 61 provides fluid communication between the second switching groove 52 and the axial opening 45.

A secondary or admittance valve bore 64 is also provided in the housing 30 and intersects the main bore 31 as shown and this bore 64 extends in a direction which is generally normal to the direction of the bore 31. The main bore wall 31 is provided with an inlet pressure groove 66 in communication with the secondary valve bore 64 and this groove 66 is normally closed by the intermediate land 49 on the valve spool 32. The main bore 31 is provided with first and second cylinder grooves 68 and 69 as well as first and second return grooves 71 and 72.

The secondary valve bore 64 is provided with a valve seat 74 and a poppet or admittance valve 75 is located in the bore 64 and is adapted to move between open and closed positions with respect to the valve seat 74. As seen in FIGURE 1, the poppet valve is located in closed position. The housing 30 is provided with a pressure entrance port 77 (FIGURE 3) in communication with the secondary valve bore 64 to an inlet side 79 of the poppet valve 75. This port 77 is connected to the power pump 22 by a fluid passage shown schematically and indicated by the reference numeral 81. As noted, the poppet valve in its closed position prohibits fluid flow from the pressure entrance port or inlet side 79 of the valve to the inlet pressure groove 66 and in open position permits such fluid flow. A first passageway in the form of a helical groove 83 on the outer surface of the poppet valve defines what may be referred to as a restricted passage from the pressure entrance port or inlet side of the poppet valve to a pressure chamber 85 formed at one end (the upper end as seen in FIGURES 1 and 2) of the poppet valve opposite the valve seat 74.

A second passageway 87 extends axially through the poppet valve from the pressure chamber 85 to the outlet side 89 of the poppet valve 75. Located in the passageway 87 is a check valve 92 with an associated seat 93 which is adapted to control fluid flow through the passageway 87 and is normally maintained in a closed position by means of a spring 95. An actuating pin or member 97 has one portion which is located in the passageway 87, which end is in a position to engage and unseat the check valve 92. A ball member 98 engages the cam surface 50 on the intermediate land 49 of the valve spool 32 and is located in engagement with the other end of the actuating pin. It will thus be seen that axial movement of the valve spool 32 will, by way of the aforementioned mechanical connection, cause the check valve 92 to be opened against the biasing of spring 95.

The opposed ends of the metering pump 24 are connected to ports 100 and 101 by means of fluid passages 102 and 103. The ports 100 and 101 are in fluid communication with switching grooves 51 and 52, respectively. The opposite ends of the work cylinder 25 are connected to ports 105 and 106 (FIGURE 3) by way of fluid passages 107 and 108. The ports 105 and 106 are in direct fluid communication with cylinder grooves 68 and 69, respectively, in the main bore wall, however, this fluid connection is illustrated in FIGURE 1 by drawing the fluid passages 107 and 108 schematically and connected directly with the aforementioned cylinder grooves. The return grooves 71 and 72 are directly connected to the reservoir 23 and this has been shown schematically in FIGURE 1 by way of fluid passage 110 interconnecting the two return grooves together and passage 111 leading to the reservoir 23. In the actual construction as seen in FIGURES 4 and 5 the return groove 71 is interconnected with return groove 72 by way of opening 110 within the main housing 30 and these two interconnected return grooves are in fluid communication with reservoir by way of passage 114 which is in fluid communication with port 115.

The operation of the hydraulic power steering system illustrated in FIGURE 1 is as follows:

Assuming it be desired to turn the vehicle wheels in a desired direction, the operator of the vehicle turns the steering wheel 27 in the appropriate direction to introduce pressurized fluid through fluid passage 102 into switching groove 51 and subsequently into chamber 39 at the right end of the valve spool, as viewed in FIGURE 1, through pasageway means 60 and axial opening 46. This introduction of fluid pressure into chamber 39 causes a force to be exerted on the valve spool 32 shifting it to the left as seen in FIGURE 1. Upon shifting of the valve spool to the left as above described, fluid communication is provided between the output side of the metering pump 24 through pasage 102 to cylinder groove 68 and through fluid passage 107 to the left end of the work cylinder 25 as seen in FIGURE 1. At the same time fluid communication is provided between inlet pressure groove 66, switching groove 52, and fluid passage 103 to the other side of the metering pump 24. Additionally, fluid communication is opened between the right end of the work cylinder 25 through fluid passage 108, cylinder 69, return groove 72 to the reservoir 23 since the return groove 72 is in communication therewith by way of passage 114 and fluid passage 111.

Prior to the shifting of the valve spool 32 to the left as hereinabove described, the poppet or admittance valve 75 was in the closed position as shown in FIGURE 1 against the valve seat 74, thereby preventing fluid flow, supplied from the pressure pump 22, from the inlet side 79 of the poppet valve to the outlet side 89 thereof. It will be seen with the poppet valve in the position shown in FIGURE 1 that fluid pressure at the inlet 79 constantly exerts pressure against a shoulder 80 tending to move the poppet valve upwardly as seen in FIGURE 1 to the open position. Inlet pressure is bled through the first passageway 83, which in this particular embodiment assumes the physical shape of a helical groove, and as a result inlet pressure is provided in pressure chamber 85 which pressure exerts a force in a downward direction as seen in FIGURES 1 and 2, tending to maintain the poppet valve in the closed position. Under these conditions, the poppet valve is maintained closed because the surface area upon which the pressure in chamber 85 acts is greater than the surface area of the shoulder 80. Shifting of the valve spool 32 to the left as hereinabove described causes the cam surface 50 acting on the actuating pin 97 by way of the ball 98 to physically engage the check valve 92 causing it to move off its seat 93 against the urging of spring 95 which in turn causes the pressure in chamber 85 to be bled to the outlet side 89 of the poppet valve. The hydraulic resistance in passageway 87 in the open position of the check valve 92 is less than that of the helical groove 83 and as a result the pressure in chamber 85 drops and the pressure acting on shoulder 80 causes the poppet valve to be moved to an open condition from its seat 74. It will therefore be seen that fluid under pressure from power pump 22 is not permitted to flow to the valve spool 32 until the valve spool has shifted sufficiently to open the orifices formed by the various grooves and lands on the valve spool and the main bore 31. This reduces the pressure drop across the valve spool orifices and reduces the flow forces on the valve spool. This additionally prevents silting of the valve spool which otherwise described is the building up of very small particles (contained in the hydraulic fluid) at the interface between the lands on the valve spool and on the main bore within which it resides. Silting is undesirable because it makes the valve spool more difficult to shift when desired.

As the poppet valve opens further, it will be observed that the check valve 92 will tend to close and as it closes, the pressure in chamber 85 will tend to balance the pressure acting against shoulder 80 to maintain the poppet valve in substantially a state of equilibrium. It will be seen that the poppet valve is therefore practically unsensitive to the steady state or transient flow forces because of its very high damping and also because of the stiffness of actuation of the same which is caused because of oil trapped in chamber 85. The feed back force to the valve spool 32 will depend primarily on the size of the check valve 92 and can be designed to be as small as needed.

It will be noted with the valve spool shifted to the left and the poppet valve open as described, pressurized fluid passes from the power pump 22 through the poppet valve and to the right side of metering pump 24 through fluid passage 103 by way of grooves 66 and 52. Pressurized fluid is supplied as before described to the left end of work cylinder 25 through passage 102, grooves 51 and 68, and passage 107. It will be noted that all of the fluid under pressure from power pump 22 must pass through the metering pump 24 before reaching the work cylinder 25.

Turning of the steering wheel 27 in the opposite direction causes fluid pressure to be introduced into chamber 38 by way of passage 103, groove 52, passageway means 61 and axial opening 45. This shifts the valve spool 32 to the right as seen in FIGURE 1 with opening of the valve spool orifices and subsequent opening of the poppet valve in the same manner as described in the shifting of the valve spool to the left. With the valve spool shifted to the right, fluid under pressure from pump 22 is transmitted to groove 66 and to the left side of the metering pump 24 through groove 51 and passage 102. Fluid under pressure is transmitted to the right end of work cylinder 25 from the right end of metering pump 24 through passage 103, grooves 52 and 69, and passage 108. Fluid is returned to the reservoir 23 from the left end of work cylinder 25 by way of passage 107, grooves 68, 56 and 71, and passages 110 and 111.

The design of the valve spool and its associated grooves both in the spool itself and in the bore 31 and the directions of flow with the valve spool in open position, have been designed so that in most instances, a positive total damping length results. Referring specifically to FIGURE 1 the flow distance $L_1$ for fluid flowing from groove 66 to a metering pump port will in general be a positive damping length while the flow distance $L_2$ from a hand pump port to a cylinder port will generally be a negative damping length. The flow distance $L_3$ from a cylinder port to return is also generally positive. To insure in most instances an aggregate damping length which is positive the valve is designed so that $L_1+L_3>L_2$. Since $L_1$ and $L_3$ can occasionally become negative, all the mentioned damping lengths have been made as short as possible.

Figure 7:
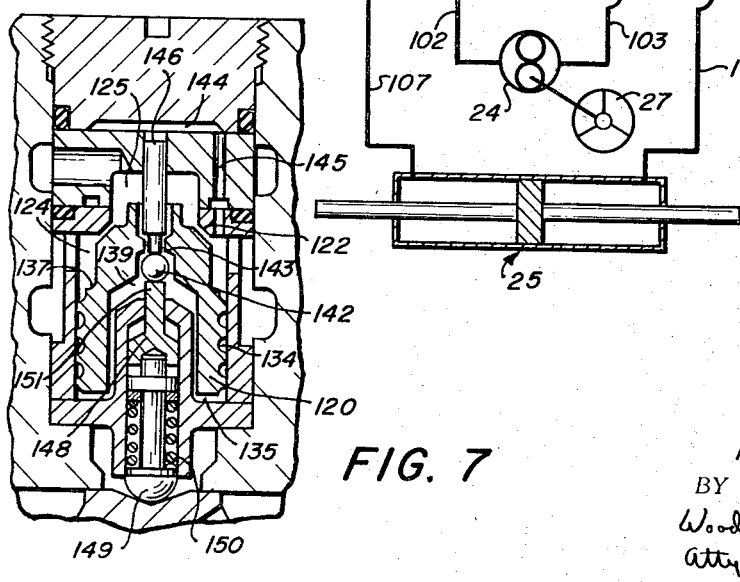
FIGURE 7 is an enlarged fragmentary view of a portion of the valve shown in FIGURE 6.

FIGURES 6 and 7 show a modified form of the valve illustrated in FIGURE 1 as designed for use in a hydrostatic power steering system with the hydraulic circuit being of the open center type. The valve housing and a substantial part of the structure are identical with the structure shown and illustrated in FIGURE 1 and where identical parts are utilized, the same reference numerals are used as in FIGURE 1. The primary difference involved is in the construction of the poppet or admittance valve and in FIGURES 6 and 7 the poppet valve is indicated by the reference numeral 120. The poppet valve 120 is provided with a valve seat 122 and this poppet valve is movable between an open position in which it is seen in FIGURES 6 and 7 to a closed position. In the closed position the poppet valve engages the valve seat 122 and prevents fluid flow from an inlet side 124 of the valve to an outlet side 125. Fluid is supplied from the power pump 22 to the inlet side in exactly the same manner as supplied in the description of FIGURE 1. A pressure exit port 127 (FIGURE 3) is provided in the housing (which is not used in the embodiment of FIGURE 1 and is closed with plug 153) and serves to transmit fluid from the outlet side 125 of the poppet valve by way of a fluid passage 129 to the reservoir 23. Another fluid passage 131 supplies fluid pressure to the inlet pressure groove 66 by way of a port 132. (Port 132 is closed in the embodiment of FIGURE 1 by plug 154.) A first passageway 134 in the form of a helical groove on the outer surface of the poppet valve 120 serves to transmit fluid pressure from the inlet side 124 of the poppet valve to a pressure chamber 135 at the lower end of the poppet valve as seen in FIGURES 6 and 7. The poppet valve is also provided with a shoulder 137 upon which inlet pressure acts tending to maintain the poppet valve in its normally open position. The poppet valve is also provided with a second passageway 139 which leads from the chamber 135 to the outlet side 125. Located in the second passageway 139 is a check valve 142 and check valve seat 143. The check valve 142 is normally maintained in open position by means of inlet pressure transmitted to a chamber 144 through opening 145 which in turn acts on a piston 146 engageable with the check valve. An actuating pin 148 is provided which has a head 149 normally engaging the cam surface 50 on the valve spool 32. A spring 150 engages head 149 at one end and a separate member (not numbered and located between head 149 and an end 151 of pin 148) at the other end and this construction is to take care of machining tolerances so that the poppet valve will close before the end of travel of spool 32. The end of the actuating pin 151 opposite the head 149 is engageable with the check valve 142 and upon upward movement of the same as seen in FIGURES 6 and 7, causes closing of the check valve.

The power pump 22 shown in FIGURE 6 is of the constant flow type and in the position of poppet valve 120 shown in FIGURES 6 and 7 fluid from the power pump 22 is continuously circulated through the poppet valve from the inlet to the outlet side thereof and back to the reservoir 23 by way of fluid passage 129. Upon shifting of the valve spool 32 in either of its two opposed axial directions, by manipulation of the steering wheel 27 and actuation of the metering pump 24 as hereinabove described in the operation of FIGURE 1, the engagement of cam surface 50 with the head 149 of the actuating pin causes the check valve 142 to be closed against its seat 143. In the closed condition of the check valve 142, pressure transmitted from the inlet side 124 to the pressure chamber 135 starts to build up and since the surface area acted upon by this pressure is greater than the surface area on shoulder 137, the poppet valve closes. There will also be an equilibrium position whereat valve 142 will be neither completely open nor closed and its position will be such that the poppet valve will also be in equilibrium with the force on the upper and lower ends being equal.

In the closed position of the poppet valve fluid flow across this valve is prevented and fluid from the power pump 22 is in effect diverted through passage 131 and port 132 to the inlet pressure groove 66 and to either the groove 51 or 52 depending on which direction the valve spool 32 has been previously shifted. Fluid is ported to the work cylinder 25 as described in the operation of FIGURE 1 in accordance with the direction spool 32 is moved. After the valve spool 32 has returned to its neutral position the check valve 142 is caused to open by the engagement of the same with the piston 146. In this design the areas upon which the various fluid pressures in the poppet valve act (that is the side of piston 146, actuating pin 150, and check valve 142) are such that the piston 146 will always open the check valve 142.

It will thus be seen that the valve designed for an open center circuit has basically the same advantages which have been designed into the poppet valve used in the construction of the closed center system. It will be particularly noted that the poppet valve assures that the flow from the power pump will not occur until after the valve spool 32 has shifted with resultant opening of the valve spool orifices. This greatly reduces the flow forces acting on the valve spool and as above mentioned, the design of the poppet valve makes the same quite stable. This particular construction, as in the closed center circuit design, also greatly minimizes the silting problem particularly inherent in power steering systems.

It will thus be seen with the described control valve construction that all of the hereinabove stated objects are carried out and it will also be appreciated by those skilled in the art that the present invention has application to many different hydraulic powered circuits.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An open center valve construction including in combination a housing having a main bore, a valve spool in said main bore movable from a neutral position in first and second opposed axial directions, wall means defining a porting on said spool and in said main bore for providing fluid communication between fluid components connected to said porting upon movement of said valve spool, a secondary bore in said housing intersecting said main bore and extending in a direction generally normal thereto, a valve seat in said secondary bore, a poppet valve movable into and out of engagement with said valve seat to alternately prevent and permit fluid communication between an inlet and outlet side of said poppet valve, wall means defining a fluid chamber in said secondary bore at an end of said poppet valve opposite said valve seat, wall means defining a fluid passage extending from said fluid chamber to said outlet side of said poppet valve, a check valve in said fluid passage biased to open position and normally maintained open to allow fluid flow from said fluid chamber to said outlet side of said poppet valve, wall means on the outer surface of said poppet valve defining a helical groove providing fluid communication between said inlet side of said poppet valve and said fluid chamber, a cam surface on said valve spool, an actuating pin engaging said cam surface at one end and engageable with said check valve at another end, means for moving said valve spool in one of said first and second opposed axial directions whereby said actuating pin closes said check valve increasing fluid pressure in said fluid chamber thereby causing said poppet valve to move into engagement with said valve seat and prohibit fluid flow from said inlet to said outlet side of said poppet valve.

2. A valve construction including in combination a housing having a main bore, a valve spool in said main bore movable from first to second positions, wall means defining porting on said spool and in said main bore for providing fluid communication between fluid components connected to said porting upon movement of said valve spool, a secondary bore in said housing, a valve seat in said secondary bore, a poppet valve movable into and out of engagement with said valve seat to alternately prevent and permit fluid communication between an inlet and outlet side of said poppet valve, wall means defining a fluid chamber in said secondary bore at an end of said poppet valve opposite said valve seat, wall means defining a first fluid passage extending from said fluid chamber to said outlet side of said poppet valve, a valve in said first fluid passage biased to open position and normally maintained open to allow fluid flow from said fluid chamber to said outlet side of said poppet valve, wall means defining a second fluid passage providing fluid communication between said inlet side of said poppet valve and said fluid chamber, cam means on said valve spool, an actuating member acting between said cam means and said valve in said first fluid passage, means for moving said valve spool whereby said actuating member closes said valve in said first fluid passage increasing fluid pressure in said fluid chamber thereby causing said poppet valve to move into engagement with said valve seat and prohibit fluid flow from said inlet to said outlet side of said poppet valve.

3. A valve construction including in combination a housing having a main bore, a movable valve spool in said main bore, wall means defining porting on said spool and in said main bore for providing fluid communication between fluid components connected to said porting, a secondary bore in said housing, a valve seat in said secondary bore, a poppet valve movable into and out of engagement with said valve seat to alternately prevent and permit fluid communication between an inlet and outlet side of said poppet valve, wall means defining a fluid chamber in said secondary bore at an end of said poppet valve opposite said valve seat, wall means defining a first fluid passage extending from said fluid chamber to said outlet side of said poppet valve, a valve in said first fluid passage biased to open position and normally maintained open to allow fluid flow from said fluid chamber to said outlet side of said poppet valve, wall means defining a second fluid passage providing fluid communication between said inlet side of said poppet valve and said fluid chamber, means acting between said valve spool and said valve in said first fluid passage whereby movement of said valve spool closes said check valve increasing fluid pressure in said fluid chamber thereby causing said poppet valve to move into engagement with said valve seat and prohibit fluid flow from said inlet to said outlet side of said poppet valve.

4. A closed center valve construction for use in a hydrostatic power steering system having a power pump, a reservoir, a metering pump, and a piston and cylinder arrangement for moving vehicle wheels; including in combination a housing having wall means defining a generally cylindrically shaped main bore, a valve spool positioned in said bore and adapted for movement to first and second positions from a neutral position, first and second chambers at opposed ends of said valve spool, first and second springs in said first and second chambers respectively and engaging opposed ends of said valve spool to urge said valve spool to said neutral position, wall means defining first and second axial openings in opposed ends of said valve spool respectively in communication with said first and second chambers, wall means on the outer surface of said valve spool defining a cam surface on an intermediate land of said valve spool, wall means defining a switching groove on either side of said intermediate land and defining a return-cylinder groove on either end of said valve spool spaced from a respective switching groove by a land, first passageway means providing fluid communication between said first axial opening and the switching groove on the opposite side of said intermediate land therefrom, second passageway means providing fluid communication between said second axial opening and the switching groove on the opposite side of said intermediate land therefrom, a secondary valve bore in said housing intersecting said main bore and extending in a direction generally normal thereto, wall means defining an inlet pressure groove in said main bore wall normally closed by said intermediate land on said valve spool, wall means defining a cylinder groove in said main bore wall on each side of said inlet pressure groove, wall means defining a return groove in said main bore wall on each side of said respective cylinder groove opposite said inlet pressure groove, a valve seat in said secondary valve bore, a poppet valve in said secondary valve bore and movable between open and closed positions with respect to said valve seat, a pressure entrance port in said housing communicating with said secondary valve bore and adapted to be fluid connected to the power pump, said poppet valve in closed position prohibiting fluid flow from said pressure entrance port to said inlet pressure groove and in open position permitting fluid flow, a helical groove on the outer surface of said poppet valve defining a restricted passage from said pressure entrance port to a pressure chamber at an end of said poppet valve opposite said valve seat, an axially extending passage extending from said pressure chamber to said inlet pressure groove, a check valve and check valve seat in said axially extending passage for controlling fluid flow therethrough, a spring normally urging said check valve to a closed position against said check valve seat, an actuating pin in said axially extending passage, a ball member engaging said cam surface on said valve spool at one portion and being engageable with an end of said actuating pin at another portion, another end of said actuating pin being engageable with said check valve whereby upon axial movement of said valve spool said check valve is opened by way of said ball member and actuating pin, said switching grooves adapted to be fluid connected to opposite sides of the metering pump, said cylinder grooves adapted to be connected to opposite sides of the piston and cylinder arrangement, and said return grooves adapted to be connected to the reservoir.

5. A closed center valve construction for use in a hydrostatic power steering system having a power pump, a reservoir, a metering pump, and a piston and cylinder arrangement for moving vehicle wheels; including in combination a housing having wall means defining a main bore, a valve spool positioned in said bore and adapted for movement to first and second positions from a neutral position, first and second chambers at opposed ends of said valve spool, first and second springs in said first and second chambers respectively and engaging opposed ends of said valve spool to urge said valve spool to said neutral positions, wall means on the outer surface of said valve spool defining a cam surface on an intermediate land of said valve spool, wall means defining a switching groove on either side of said intermediate land and defining a return-cylinder groove on either end of said valve spool spaced from a respective switching groove by a land, first passageway means providing fluid communication between said first chamber and the switching groove on the opposite side of said intermediate land therefrom, second passageway means providing fluid communication between said second chamber and the switching groove on the opposite side of said intermediate land therefrom, a secondary valve bore in said housing intersecting said main bore, wall means defining an inlet pressure groove in said main bore wall normally closed by said intermediate land on said valve spool, wall means defining a cylinder groove in said main bore wall on each side of said inlet pressure groove, wall means defining a return groove in said main bore wall on each side of said respective cylinder groove opposite said inlet pressure groove, a valve seat in said secondary valve bore, a poppet valve in said secondary valve bore and movable between open and closed positions with respect to said valve seat, a pressure entrance port in said housing communicating with said secondary valve bore and adapted to be fluid connected to the power pump, said poppet valve in closed position prohibiting fluid flow from said pressure entrance port to said inlet pressure groove and in open position permitting fluid flow, a first passage from said pressure entrance port to a pressure chamber at an end of said poppet valve, a second passage extending from said pressure chamber to said inlet pressure groove, a valve in said second passage for controlling fluid flow therethrough, means normally urging said valve in said second passage to a closed position, actuating means between said cam surface and said valve in said second passage whereby upon axial movement of said valve spool said valve is opened, said switching grooves adapted to be fluid connected to opposite sides of the metering pump, said cylinder grooves adapted to be connected to opposite sides of the piston and cylinder arrangement, and said return grooves adapted to be connected to the reservoir.

6. An open center valve for use in a hydrostatic power steering system having a power pump, a reservoir, a metering pump, and a piston and cylinder arrangement for moving vehicle wheels including in combination a housing having wall means defining a generally cylindrically shaped main bore, a valve spool positioned in said bore and adapted for movement to first and second positions from a neutral position, first and second chambers at opposed ends of said valve spool, first and second springs in said first and second chambers respectively constantly urging said valve spool to neutral position, wall means defining first and second axial openings in opposed ends of said valve spool respectively in communication with said first and second chambers, wall means on the outer surface of said valve spool defining a cam surface on an intermediate land of said valve spool, wall means defining a switching groove on either side of said intermediate land and defining a return-cylinder groove on either end of said valve spool spaced from a respective switching groove by a land, first passageway means providing fluid communication between said first axial opening and the switching groove on the opposite side of said intermediate land therefrom, second passageway means providing fluid communication between said second axial opening and the switching groove on the opposite side of said intermediate land therefrom, a secondary valve bore in said housing, wall means defining an inlet pressure groove in said main bore wall normally closed by said intermediate land on said valve spool, wall means defining a cylinder groove in said main bore wall on each side of said inlet pressure groove, wall means defining a return groove in said main bore wall on each side of said respective cylinder groove opposite said inlet pressure groove, a valve seat in said secondary valve bore, a poppet valve in said secondary valve bore and movable between open and closed positions with respect to said valve seat, a first pressure entrance port in said housing communicating with said secondary valve bore and adapted to be fluid connected to the power pump, a second pressure entrance port in said housing communicating with said inlet pressure groove and adapted to be connected to the power pump, a pressure exit port in said housing communicating with said secondary valve bore and adapted to be fluid connected to the reservoir, said poppet valve in closed position prohibiting fluid flow from said first pressure entrance port to said pressure exit port and in open position permitting fluid flow, a helical groove on the outer surface of said poppet valve defining a restricted passage from said pressure entrance port to a pressure chamber at an end of said poppet valve opposite said valve seat, an axially extending passage extending from one end of said poppet valve to the other to provide fluid communication between said pressure chamber and said pressure exit port, a check valve and check valve seat in said axially extending passage for controlling fluid flow therethrough, means normally acting on said check valve to urge same to an open position, an actuating pin in said axially extending passage, an end of said actuating pin engaging said cam surface on said valve spool, another end of said actuating pin being engageable with said check valve whereby upon axial movement of said valve spool said check valve is closed by way of said cam surface and said actuating pin, said switching grooves adapted to be connected to opposite sides of the metering pump, said cylinder grooves adapted to be connected to opposite sides of the piston and cylinder arrangement, and said return grooves adapted to be connected to the reservoir.

7. An open center valve for use in a hydrostatic power steering system having a power pump, a reservoir, a metering pump, and a piston and cylinder arrangement for moving vehicle wheels including in combination a housing having wall means defining a main bore, a valve spool positioned in said bore and adapted for movement to first and second positions from a neutral position, means urging said valve spool to neutral position, first and second chambers at opposed ends of said valve spool, wall means on the outer surface of said valve spool defining a cam surface on an intermediate land of said valve spool, wall means defining a switching groove on either side of said intermediate land and defining a return-cylinder groove on either end of said valve spool spaced from a respective switching groove by a land, first passageway means providing fluid communication between said first chamber and the switching groove on the opposite side of said intermediate land therefrom, second passageway means providing fluid communication between said second chamber and the switching groove on the opposite side of said intermediate land therefrom, a secondary valve bore in said housing, wall means defining an inlet pressure groove in said main bore wall normally closed by said intermediate land on said valve spool, wall means defining a cylinder groove in said main bore wall on each side of said inlet pressure groove, wall means defining a return groove in said main bore wall on each side of said respective cylinder groove opposite said inlet pressure groove, a valve seat in said secondary valve bore, a poppet valve in said secondary valve bore and movable between open and closed positions with respect to said valve seat, a first pressure entrance port in said housing communicating with said secondary valve bore and adapted to be fluid connected to the power pump, a second pressure entrance port in said housing communicating with said inlet pressure groove and adapted to be connected to the power pump, a pressure exit port in said housing communicating with said secondary valve bore and adapted to be fluid connected to the reservoir, said poppet valve in closed position prohibiting fluid flow from said pressure entrance port to said pressure exit port and in open position permitting fluid flow, a first passage from said pressure entrance port to a pressure chamber at an end of said poppet valve, a second passage extending from one end of said poppet valve to the other to provide fluid communication between said pressure chamber and said pressure exit port, a valve in said second passage for controlling fluid flow therethrough, means normally acting on said check valve to urge same to an open position, actuating means between said cam surface and said valve in said second passage whereby upon axial movement of said valve spool said valve in said second passage is closed, said switching grooves adapted to be connected to opposite sides of the metering pump, said cylinder grooves adapted to be connected to opposite sides of the piston and cylinder arrangement, and said return grooves adapted to be connected to the reservoir.

8. A hydrostatic power steering system including in combination a power pump, a reservoir, a metering pump, a piston and cylinder arrangement for moving vehicle wheels and valving means, said valving means including a housing having a bore, a movable valve member in said bore, wall means defining porting on said valve member and in said bore, fluid conduit means connecting opposite sides of said metering pump to said porting, fluid conduit means connecting opposite sides of said piston and cylinder arrangement to said porting, fluid conduit means connecting said reservoir to said porting, an admittance valve in said housing having inlet and outlet sides, fluid conduit means connecting said inlet side of said admittance valve to said power pump and said outlet side to said porting, said admittance valve in its normally closed position preventing fluid from passing from said power pump to said porting, a fluid chamber adjacent said admittance valve, a first fluid passage connecting said fluid chamber to said inlet side of said admittance valve, fluid pressure in said fluid chamber admitted through said first fluid passage from said power pump normally maintaining said admittance valve closed, a pilot valve in said housing connecting said fluid chamber to said porting, means acting between said movable valve member and said pilot valve whereby movement of said valve member causes opening of said pilot valve, means for moving said valve member, opening of said pilot valve upon movement of said valve member causing reduction of fluid pressure in said fluid chamber and opening of said admittance valve because of fluid pressure from said power pump acting on said admittance valve from the inlet side thereof with passage of fluid pressure from said power pump to said porting, said movement of said valve member causing power pump fluid to be passed through said porting to said metering pump and then to said piston and cylinder arrangement and return fluid from said piston and cylinder arrangement is passed through said porting and back to said reservoir.

9. A hydrostatic power steering system as claimed in claim 8 wherein said means which act between said valve member and pilot valve to open said pilot valve comprises cam means.

10. A hydrostatic power steering system as claimed in clam 8 wherein said means for moving said valve member comprises fluid pressure means generated by said metering pump.

References Cited
UNITED STATES PATENTS

| | | | |
|---|---|---|---|
| 1,850,354 | 3/1932 | Owens | 251—38 |
| 2,020,833 | 11/1935 | Hansen | 251—38 X |
| 2,020,951 | 11/1935 | Lemon | 60—52 |
| 2,644,429 | 7/1953 | Waterman et al. | 137—612.1 X |
| 2,679,263 | 5/1954 | Kiser et al. | 137—596.13 |
| 2,882,867 | 4/1959 | Thompson | 137—609 |
| 2,968,316 | 1/1961 | Schultz | 137—596 |
| 3,246,472 | 4/1966 | Kries | 60—52 |

HENRY T. KLINKSIEK, *Primary Examiner.*